(12) United States Patent
Papin et al.

(10) Patent No.: US 10,405,536 B2
(45) Date of Patent: Sep. 10, 2019

(54) METHOD AND DEVICE FOR VISUALLY SCARING ANIMAL SPECIES, IN PARTICULAR BIRD SPECIES

(71) Applicants: Airbus Operations SAS, Toulouse (FR); Universite Rennes 1, Rennes (FR); Centre National de la Recherche Scientifique, Paris (FR)

(72) Inventors: Nathalie Papin, Toulouse (FR); Martine Hausberger, Paimpont (FR); Laurence Henry, Thorigne-Fouillard (FR); Jean-Pierre Richard, La Chapelle des Fougeretz (FR); Emmanuel De Margerie, Rennes (FR)

(73) Assignees: Airbus Operations SAS (FR); Universite Rennes 1 (FR); Centre National de la Recherche Scientifique (CNRS) (FR)

( * ) Notice: Subject to any disclaimer, the term of this patent is extended or adjusted under 35 U.S.C. 154(b) by 436 days.

(21) Appl. No.: 14/358,335

(22) PCT Filed: Nov. 16, 2012

(86) PCT No.: PCT/FR2012/052654
§ 371 (c)(1),
(2) Date: May 15, 2014

(87) PCT Pub. No.: WO2013/072642
PCT Pub. Date: May 23, 2013

(65) Prior Publication Data
US 2014/0318474 A1 Oct. 30, 2014

(30) Foreign Application Priority Data
Nov. 18, 2011 (FR) ...................................... 11 60545

(51) Int. Cl.
*A01K 37/00* (2006.01)
*A01M 29/06* (2011.01)

(52) U.S. Cl.
CPC .................................. *A01M 29/06* (2013.01)

(58) Field of Classification Search
CPC ...... A01M 29/06; A01M 29/00; A01M 29/08; A01M 29/10; A01M 31/002; A01M 29/18;
(Continued)

(56) References Cited

U.S. PATENT DOCUMENTS

| 2,042,815 A * | 6/1936 | White | G02B 15/14 353/110 |
| 4,736,907 A * | 4/1988 | Steffen | B64D 45/00 244/1 R |

(Continued)

FOREIGN PATENT DOCUMENTS

| JP | 2009 089645 A | 4/2009 |
| JP | 2010 017159 A | 1/2010 |

(Continued)

OTHER PUBLICATIONS

Int'l Search Report (dated Feb. 14, 2013) PCT/FR2012/052654.

*Primary Examiner* — Yvonne R Abbott-Lewis
(74) *Attorney, Agent, or Firm* — Lerner, David, Littenberg, Krumholz & Mentlik, LLP

(57) ABSTRACT

A device for visually scaring animal species, in particular bird species includes means for generating at least one visual signal including at least one image, varying in size over time, which simulates approach via an increase in the size of the image. For example, the visual signal includes one of the following images: eyes, a disc, and a spiral.

12 Claims, 3 Drawing Sheets

(58) Field of Classification Search
CPC ....... A01M 29/16; A01M 29/26; A01K 15/02;
A01K 45/007; A01K 37/00; A01K 29/00;
A01K 31/00; A01K 31/002; A01K
45/005; A01K 61/001; A01K 79/02;
A01K 11/008; A01K 13/001; A01K
15/022; A01K 1/0613; A01K 2227/30;
A01K 2267/02; A01K 27/004; A01K
29/005; A01K 31/007; A01K 31/12;
A01K 31/22; A01K 35/00; A01K 43/04;
A01K 43/06; A01K 61/00; A01K 63/00;
A01K 67/02; B64D 45/00; B64D
2045/0065; B64D 27/20; B64D 47/02;
B64D 2045/0095; B64D 2045/007; B64D
2203/00; B64D 47/06; G09F 21/06
USPC ......... 119/713, 712; 244/1 R, 15, 30, 114 R;
362/470; 340/573.2, 981
See application file for complete search history.

(56) References Cited

U.S. PATENT DOCUMENTS

| | | | | |
|---|---|---|---|---|
| 4,790,629 A * | 12/1988 | Rand | ................. | A63J 17/00 345/32 |
| 4,814,800 A * | 3/1989 | Lavinsky | ................ | A63J 17/00 353/50 |
| 5,774,088 A | 6/1998 | Kreithen | | |
| 6,623,243 B1 * | 9/2003 | Hodos | ................. | A61B 5/0496 351/237 |
| 7,134,926 B2 * | 11/2006 | Moeller | ................ | A01M 29/06 441/64 |
| 7,189,128 B2 * | 3/2007 | Halliday | ................ | A41D 13/00 2/2.15 |
| 8,123,476 B2 * | 2/2012 | Stommel | ................ | A01M 29/18 290/44 |
| 8,164,462 B1 * | 4/2012 | Bose | ...................... | A01M 29/10 119/712 |
| 8,816,863 B2 * | 8/2014 | Arman | .................... | 116/22 A |
| 8,933,819 B1 * | 1/2015 | Garrettson | ............ | B64D 45/00 340/945 |
| 9,226,492 B2 * | 1/2016 | Brown | ................. | A01M 29/10 |
| 9,324,248 B2 * | 4/2016 | Garrettson | ............ | G09F 21/08 |
| 9,567,102 B1 * | 2/2017 | Ross | ..................... | B64D 45/00 |
| 2003/0174504 A1 * | 9/2003 | Tamaoki | ............... | A01M 29/08 362/470 |
| 2005/0028720 A1 | 2/2005 | Bell et al. | | |
| 2005/0284411 A1 * | 12/2005 | Yoshizawa | ............ | A01M 29/08 119/713 |
| 2007/0163516 A1 * | 7/2007 | D'Andrea | ............. | A01M 29/06 119/713 |
| 2008/0047176 A1 * | 2/2008 | Thiele | ...................... | B64B 1/14 40/212 |
| 2008/0055285 A1 * | 3/2008 | Ishikawa | ............... | G09F 21/045 345/204 |
| 2009/0195753 A1 * | 8/2009 | Dill | ........................ | G03B 21/00 353/28 |
| 2010/0079729 A1 * | 4/2010 | Scanlon | ................. | G03B 21/00 353/13 |
| 2010/0230531 A1 * | 9/2010 | Fayed | ...................... | F41F 1/06 244/30 |
| 2011/0188257 A1 * | 8/2011 | Sidler | ................... | B64D 47/02 362/470 |
| 2012/0212712 A1 * | 8/2012 | Scanlon | ............... | G03B 21/562 353/121 |
| 2012/0327378 A1 * | 12/2012 | Harvey | ................ | G03B 21/145 353/52 |
| 2013/0180466 A1 * | 7/2013 | Brown | ................. | A01M 29/10 119/713 |
| 2014/0305382 A1 * | 10/2014 | Hill | ....................... | A01M 29/08 119/713 |

FOREIGN PATENT DOCUMENTS

| | | |
|---|---|---|
| JP | 2010 081928 A | 4/2010 |
| JP | 2011 155856 A | 8/2011 |

* cited by examiner

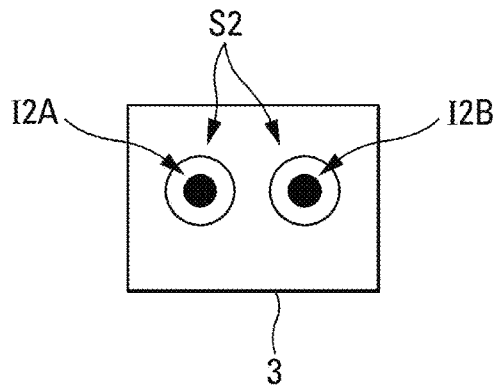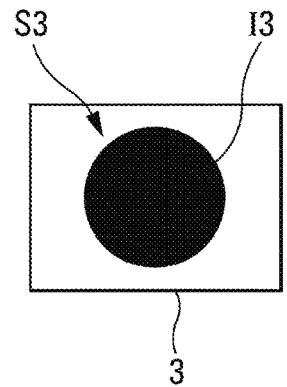
Fig. 4    Fig. 5
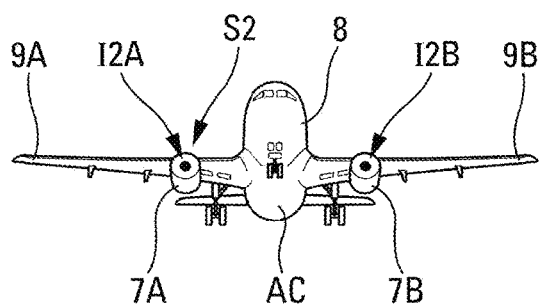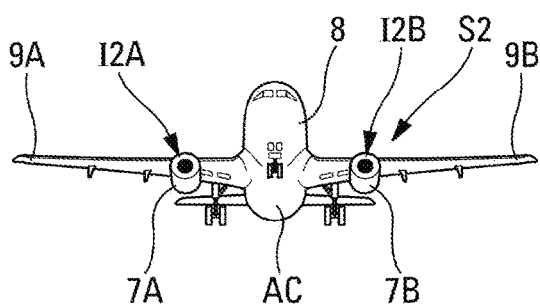
Fig. 6A    Fig. 6B
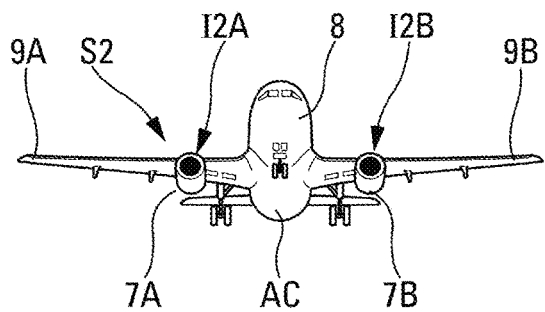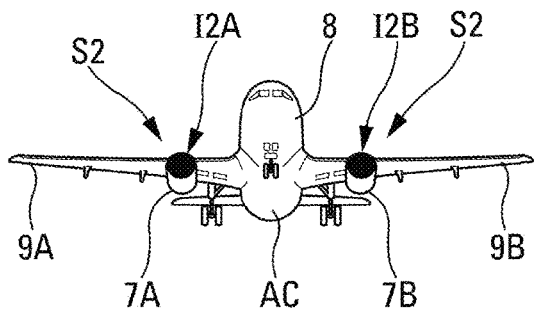
Fig. 6C    Fig. 6D

METHOD AND DEVICE FOR VISUALLY SCARING ANIMAL SPECIES, IN PARTICULAR BIRD SPECIES

CROSS-REFERENCE TO RELATED APPLICATIONS

The present application is a national phase entry under 35 U.S.C. § 371 of International Application No. PCT/FR2012/052654, filed Nov. 16, 2012, published in French, which claims priority from French Application No. 1160545, filed Nov. 18, 2011, all of which are incorporated herein by reference.

The present invention relates to a method and to a device for visually scaring animal species and more particularly avian species.

The object of such a device is to repel avian species or the like away from sensitive zones of human activity by the generation of visual signals.

The present invention may in particular apply to the agricultural field, to the field of wind power and to the field of architecture (buildings).

The present invention can likewise apply to visually scaring avian species at an airport, in particular in order to limit collisions of birds with aircraft.

The conventional means for visual scaring on the ground involve scarecrows, lures, balloons, mirrors, live falcons and light systems such as flashing lights or lasers. The effectiveness of these conventional means is variable, and in most cases birds become habituated to them relatively quickly. The majority of these means benefit from "bio-visual" scaring devices, intended to reproduce biological indices.

The use of light stimuli which birds are not accustomed to, and more particularly lasers, has produced variable results depending on the context and the species in question, but may prove useful when complemented by other techniques (pyrotechnics, . . . ). The effectiveness of light signals is restricted by day and particularly by fine weather, not to mention the safety aspects which govern their use (effects of lasers on the retina for example).

In addition to the general problems of habituation, all of these conventional devices also have the drawback of functioning solely on the ground, whereas at an airport more than half of collisions take place in flight, principally in approach and ascent phases.

Various conventional devices exist which are based on artificial light signals. Nevertheless, none of these devices has proved effective.

Consequently, the principal problems of conventional visual scaring devices, in addition to their entirely relative capacity for scaring avian species, are the phenomena of habituation of birds and the limitation of effective use of these devices on the ground and in low light conditions.

In addition, the bird deterrent means installed on airport sites are very heterogeneous from one geographical area to another and from one airport to another, and are dependent upon the local aeronautical regulations in force, as well as the will of the local authorities. There is no scaring technique which is totally satisfactory on the ground, and even the best equipped airports are asking for more efficient solutions.

Finally, it appears that a significant number of collisions take place in flight, sometimes outside the airport area. Few onboard systems exist and they have in no way proved their effectiveness either in scaring birds or in their ability to prevent habituation. Consequently, at present there is no solution in existence which involves a really effective onboard device, nor a technique of scaring birds on the ground which is considered entirely satisfactory.

The object of the present invention is to remedy the aforementioned drawbacks. It relates to a method for visually scaring animal species, in particular avian species, which is particularly effective.

To this end, said method is remarkable, according to the invention, in that at least one visual signal is generated comprising at least one image, varying in size over time, which simulates approach by an increase in the size of the image.

Preferably:
  for one and the same visual signal, a sequence of increases in the size of the corresponding image is produced, each time from a minimum size (which may be zero) to a maximum size; and/or
  several different visual signals are generated successively; and/or
  each visual signal comprises one of the following images:
    eyes, which are particularly effective against raptors;
    a disc, for example black, which is effective against passerines (and most other avian species); and
    a spiral, which is effective against galliformes.

Thus, the present invention provides for generating one or more visual signals, of the "looming" type, which simulate an approach by an increase in the size of the image, for the purpose of scaring avian species.

The method according to the present invention preferably provides a series of different signals which is effective on a large number of birds. This method can in particular be implemented in order to repel birds from areas where their presence appears detrimental or dangerous with respect to human activities, and in particular at airports.

In the case of application to an airport, the method for visual scaring according to the present invention is used in order to divert birds from the routes of aeroplanes whether they are in flight or on the ground, the object being to substantially reduce bird strikes in the approach, ascent and taxiing phases. As a function of the nature of the visual stimuli (or signals) used and the combination thereof, effectiveness for a wide variety of birds is obtained.

The method according to the invention therefore consists of transmitting one or more types of signals (three signals in particular), having proved their effectiveness on different groups of birds (raptors, passerines, gallinaceans) in experiments, in the course of which they induced, contrary to other (conventional) stimuli, major reactions of fear and avoidance. The joint use of the aforementioned three preferred signals (eyes, black disc, spiral) makes it possible to sweep over a wide range and to limit the habituation, which it has been possible to demonstrate is virtually non-existent for these stimuli.

Thus this preferred choice of combined signals makes it possible to scare a widest range of different species in the entire world, without prior identification.

Advantageously, the succession of said different visual signals is generated in a random manner and at irregular intervals.

Furthermore, advantageously:
  each visual signal is generated for the same duration, for example ten seconds; and/or
  the size of the image increases progressively. It is likewise possible to achieve a non-progressive increase, for example which is accelerated or decelerated at the start and/or at the end of the modification of size or which exhibits a random variation.

In a preferred embodiment, said at least one visual signal is generated in the region of a movable unit (travelling and/or flying), preferably in the region of an aircraft and in particular a transport aeroplane.

The present invention also relates to a method and a device for visually scaring avian species.

According to the invention, said method is remarkable in that it includes means for generating at least one visual signal comprising at least one image, varying in size over time, which simulates an approach by an increase in the size of the image.

Furthermore, advantageously, said device also includes means for triggering said means for generation of a visual signal.

Said device preferably uses a series of appropriate visual signals, as mentioned above, making it possible to distance the maximum of avian species without necessarily having to identify them in advance.

The device according to the invention may be a device provided on the ground or an onboard device on an aircraft, with the particular objective of reducing bird strikes on aircraft.

In this latter application, the scaring device is independent of the local airport installations, and can therefore be used at airports with no equipment for scaring and combatting birds.

The use of such an onboard device makes it possible to reduce the risk of bird strike in flight in the phases of flight which are most at risk, and also close to and in the region of airport sites.

The present invention also relates to a movable unit, especially an aeroplane and in particular a transport aeroplane, which includes a device such as that mentioned above.

In this latter case, in a preferred embodiment, said means for generating the scaring device are arranged so as to be able to generate at least one visual signal:

in the region of the wings of said aircraft; and/or
in the region of the engines of said aircraft.

The figures of the appended drawings will enable a good understanding of how the invention can be carried out. On these drawings, identical references designate similar elements.

FIGS. 4 and 5 show respectively particular visual signals capable of being generated by a device according to the invention.

FIGS. 6A, 6B, 6C and 6D show schematically increasing successive sizes of a particular visual signal, corresponding to that of FIG. 4, which is generated by a device according to the invention.

Figure 1:
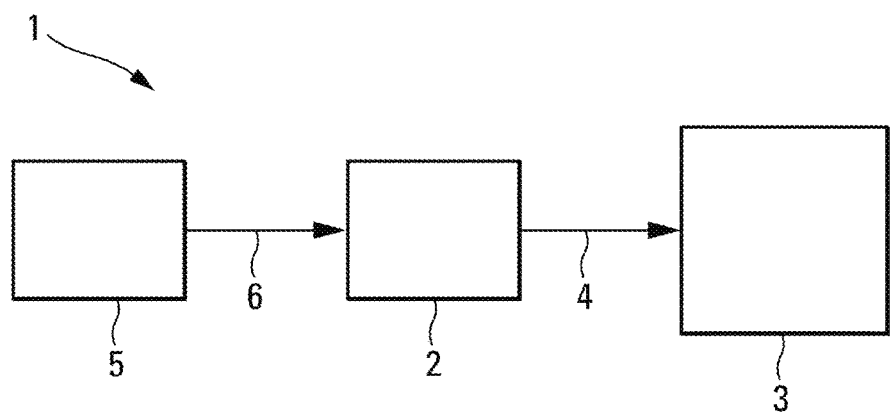
FIG. 1 shows a block diagram of a scaring device according to the invention.
Figures 2A, 2B, 2C, 2D:
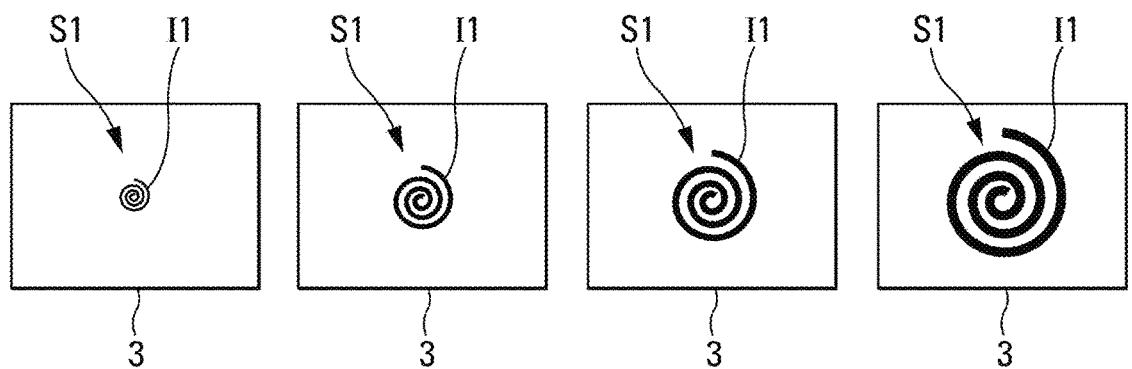
FIGS. 2A, 2B, 2C and 2D show schematically increasing successive sizes of a particular visual signal generated by a device according to the invention.

The device 1 according to the invention and represented schematically on FIG. 1 is a device for visually scaring avian species or other animal species (flying or not). The object of this device 1 is to keep bird (or animal) species or the like away from sensitive zones of human activity by the generation of visual signals.

According to the invention, said device 1 comprises:

means 2 for management of at least one visual signal S1, S2, S3 according to the invention and specified below;

means 3 specified below, which are connected by means of a connection (preferably electrical) 4 to said means 2 and which are formed in such a way as to emit at least one visual signal S1, S2, S3; and means 5 for triggering such an emission, which are connected by means of a connection (preferably electrical) 6 to said means 2 and which enable an operator, for example the pilot of an aircraft AC, to activate the device 1.

According to the invention, said means 3 generate at least one visual signal S1, S2, S3 comprising at least one image, varying in size over time, and this visual signal S1, S2, S3 simulates approach by an increase in the size of the corresponding image, as shown by way of illustration in FIGS. 2A, 2B, 2C and 2D. These FIGS. 2A to 2D show respectively four successive sizes of one and the same image I1, in this case a spiral, corresponding to the signal S1.

Figure 3:
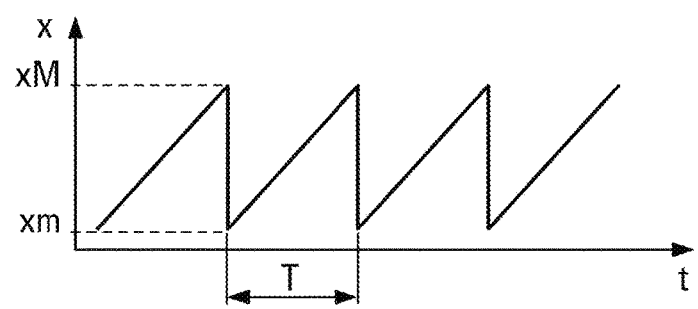
FIG. 3 is a graphic representation showing a preferred variation of the size of an image as a function of time.

Moreover, said means 3 preferably generate for one and the same visual signal (for example S1), a sequence of increases in the size of the corresponding image (for example I1), each time from a minimum size xm (which may be zero) to a maximum size xM, as shown in FIG. 3. This FIG. 3 shows the progression of the size x, for example the diameter of the spiral of FIGS. 2A to 2D, as a function of the time t. In FIG. 3, each increase in size has the same duration T, for example two seconds.

In a preferred embodiment, specified below, said means 3 successively generate several different visual signals S1, S2 and S3, each of which comprises a particular image.

Thus, the device 1 according to the invention provides for the generation of one or several visual signals S1, S2, S3, of the "looming" type, which simulate, by an increase in the size of the corresponding image, a rapid approach of the elements shown by the image, this visual simulation of an approach enabling scaring of the birds.

The device 1 preferably provides a series of different signals which is effective on a large number of avian species, as specified below. This device 1 can in particular be implemented in order to repel birds from areas where their presence appears detrimental or dangerous with respect to human activities, and in particular at airports.

In the case of application to an airport, the device 1 for visual scaring according to the present invention is used in order to divert birds from the routes of aeroplanes whether they are in flight or on the ground, the object being to substantially reduce bird strikes in the approach, ascent and taxiing phases. As a function of the nature of the visual stimuli (or signals) used and the combination thereof, it is possible to obtain effective scaring for a wide variety of birds.

In a preferred embodiment, said means 3 generate at least one visual signal S1, S2, S3 comprising at least one of the following images:

for the visual signal S1, a spiral I1, not turning but approaching, as shown in FIGS. 2A to 2D, which has demonstrated an effectiveness against galliformes;

for the visual signal S2, eyes, of which each eye 12A, 12B is represented in the form of a black disc on a white circle, as illustrated in FIG. 4, these eyes being particularly effective against raptors; and for the visual signal S3, a disc black I3, as represented in FIG. 5, which is extremely effective against all the passerines tested of European or African origin, and which is likewise effective against the other bird group birds, but to a lesser degree.

The device 1 according to the invention therefore emits one or more types of signal (three signals in particular), having proved their effectiveness on different groups of birds (raptors, passerines, gallinaceans) in experiments, where they induced, contrary to other conventional stimuli, major reactions of fear and avoidance.

In a preferred embodiment, said device 1 generates successively the aforementioned three preferred signals S1, S2 and S3 (spiral, eyes, black disc), which makes it possible to sweep over a wide range and to limit the habituation, which it has been possible to demonstrate is virtually non-existent for these stimuli. The succession of these three stimuli makes it possible to repel most or even all of the species encountered without the need to identify them.

In fact, experiments in the laboratory and in conditions of captivity have made it possible to test the reactions of birds singly or in a group, and to verify the effectiveness of the device 1. Experiments on the ground have confirmed these results, showing the effectiveness of these stimuli for keeping away a variety of species of passerines (bulbuls, weavers, sparrows, starlings), very quickly (less than a second in most cases). In addition, these experiments in captivity and on the ground have shown a very low habituation of the birds to these preferred signals S1, S2 and S3.

Within the scope of the present invention, the device 1 can include, as means 3 for emission of visual signals:
one and the same item of equipment, for example an electronic screen directly displaying the signal or a projection system which projects the signal onto a dedicated surface, which is used in order to emit all of the visual signals S1, S2 and S3 envisaged; or
several items of equipment, each of which is intended to emit one or more visual signals S1, S2 and S3.

Furthermore, said device 1 preferably generates a progressive increase in the size x of an image, as illustrated in FIG. 3, which shows a linear variation of x as a function of the time t. Of course it is likewise possible to achieve a non-progressive increase, for example an increase which is accelerated or decelerated at the start and/or at the end of the modification of size or an increase which exhibits a random variation.

In one example of use, the frequency of increase of a signal S1, S2, S3 of the "looming" type is 0.5 Hz (the period T having a value of two seconds), and the total duration of appearance of the successive increases (for example five successive increases) of this signal S1, S2, S3 is ten seconds.

In a preferred embodiment, the signals S1, S2 and S3 are generated by the device 1 in such a way as to succeed one another in a random manner and at variable intervals (from several seconds to a few dozen seconds) in order to limit the risks of habituation, which are also very low. This random appearance (for example: signal S1, signal S3, signal S2, signal S3, signal S1, signal S2, . . . ) is preferably preprogrammed in the means 2. Moreover, in a preferred embodiment each visual signal is generated for the same duration, for example for ten seconds.

The precise choice of these signals and their combination makes it possible to scare the maximum of different species in the entire world, without prior identification. The present invention likewise provides the possibility of emitting other types of signals than the aforementioned preferred signals S1, S2, and S3, or other successions of signals, which could in particular be more effective depending upon the country and/or the avian species targeted.

Thus, the device 1 may have, in particular:
different speeds of increase of the image;
different durations of appearance of the visual signals in question;
different levels of contrast, of resolution, of colour and/or of size for these visual signals; and
different successions of the visual signals.

These latter characteristics make it possible to increase the effectiveness of the sequence of visual signals, generated by the device 1, in particular as a function of advances in knowledge and the situation encountered (target species, country).

In a particular embodiment, one of the colours blue, violet and black is provided on a white base, which colours have proved very effective during tests on a disc. In addition, the colours and the sizes are adapted to the species to be scared.

Thus limicoles and passerines are more reactive to a black disc. Ardeidae and passerines are also reactive to a blue disc, and ardeidae, anatidae, phalacrocoracidae are reactive to a violet disc. Moreover, anatidae and ardeidae are also reactive to discs of a size reduced by 50%.

Moreover, in a simplified embodiment, the management means 2 can be integrated in the means 3 or in the means 5. Within the scope of the present invention, said device 1:
can be provided on the ground, with in particular means 3 for emission of signals which are disposed in the region of sensitive zones of human activity, in particular on an airport, and preferably near a runway;
can be mounted on another fixed structure, a building or a wind turbine;
can be mounted on a travelling vehicle, which is for example used on an airport; or
can be embedded on an aircraft AC.

Said device 1 may in particular be used for scaring avian species (or other species) on an airport, being used on the ground or onboard an aircraft AC, in particular a transport aeroplane, in particular in order to limit collisions of birds with the aircraft.

In the case in particular of an onboard device 1 on an aircraft AC, as shown by way of illustration in FIGS. 6A to 6D, this is a scaring device 1 which is independent of the local airport installations, and which can therefore be used (but not exclusively) at airports with no equipment for scaring and combatting birds, in particular in order to limit bird strikes.

In this case, the pilot can trigger the scaring device 1 (with the aid of means 5 which are provided in the cockpit) before taking off or on the approach to an airport, for which the risk of birds is suspected, without having to know the local species to be scared.

The transmission of signals during the taxiing phase makes it possible in the first place to secure the runway before takeoff. Furthermore, the transmission of signals during the initial takeoff phase and the final landing phase (below 1,500 feet) makes it possible to limit the collisions in these phases of flight (representing 70% of cases of collision, the most serious ones taking place on takeoff).

In the particular embodiment represented in FIGS. 6A, 6B, 6C and 6D, the device 1 generates the signal S2 of FIG. 4 representing eyes, emitting the images 12A and 12B respectively in the region of the engines 7A and 7B of the aircraft A (which corresponds to a twin-engine transport aeroplane). FIGS. 6A, 6B, 6C and 6D show schematically increasing successive sizes of the visual signal S2 generated by the device 1. In this case, the means 3 can include items of equipment which are, for example, arranged in the region of the air intakes or the covers of the engines 7A and 7B and which are formed in such a way as to project the images 12A and 12B onto the blades of the engines 7A and 7B.

In the case of an onboard device 1, other embodiments of the means 3 can of course be envisaged. In particular, the means 3 may be provided in order to generate the signals (by direct display or by projection) on external surfaces of the aircraft AC, for example in the region of the fuselage 8 or of the wings 9A and 9B of the aircraft AC.

An onboard device 1 is effective principally in the phases of flight close to the ground: in the taxiing phase, on takeoff, ascent, approach and landing. The effectiveness of the visual signals emitted depends in particular upon the performance of the device 1 used (size of the signals, light intensity, . . . ), as well as the meteorological conditions encountered.

Figure 7:
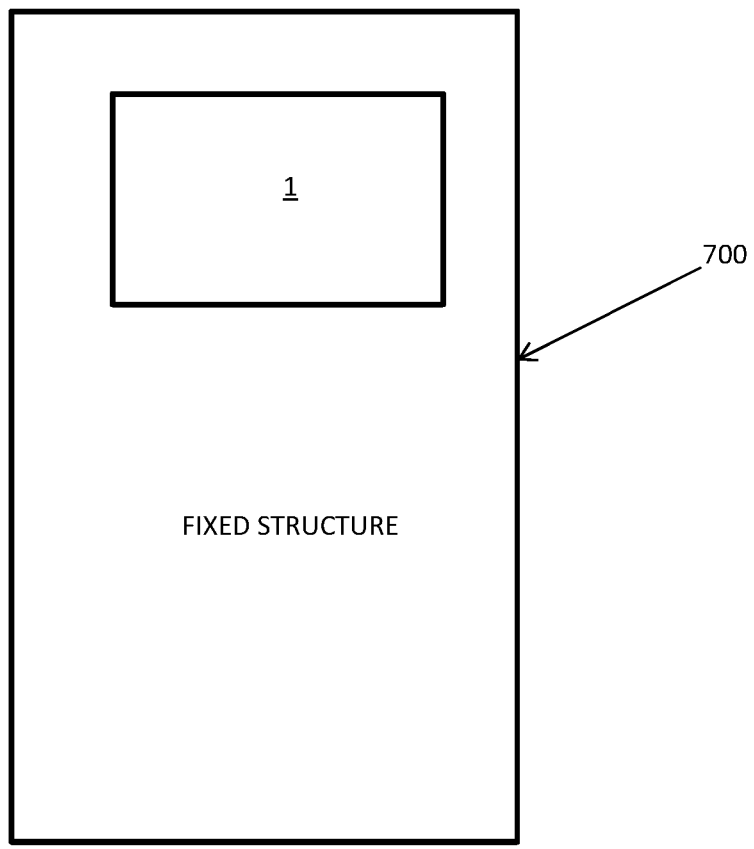
FIG. 7 show schematically a fixed structure with a scaring device according to an embodiment of the invention.

The device 1 according to the present invention may also be applied to other fields, and in particular to the agricultural field and to the field of architecture (buildings), for example, on a fixed structure 700 illustrated in FIG. 7. In an exemplary embodiment, the fixed structure 700 may take the form of a wind turbine.

Moreover, in a preferred application, at least one such device may be arranged on a wind turbine. It is known that the birds killed by the blades of a wind turbine attract other birds and create pollution.

In the usual manner, a wind turbine comprises a tower provided with a nacelle equipped with an electric generator producing electricity when a shaft is driven in rotation. This electric generator is driven in rotation by a rotor equipped with blades, which is subjected to the action of the wind.

In this application, in a particular embodiment said device is provided high up, for example in the region of the axis of rotation of the rotor blades, which makes it possible to effectively prevent the aforementioned problem.

The invention claimed is:

1. A method for visually scaring avian species away from an airport runway, the method comprising:
generating at least one image on an electronic screen, in vicinity of the airport runway such that the electronic screen is visible to avian species so as to repel the avian species away from the runway during an initial takeoff and a final landing phase of an aircraft using the runway, by a means of emission comprising the electronic screen, the at least one image varying in size over time on the dedicated surface, by an increase in the size of the at least one image over time; and
producing a sequence of the at least one image with increasing sizes, each time from a minimum size of the at least one image to a maximum size of the at least one image, to simulate approach,
wherein said at least one image comprises one of the following images:
a single disc having one of blue, violet or black colors for scaring away at least passerines.

2. The method according to claim 1, wherein a plurality of different images are generated successively.

3. The method according to claim 2, wherein the succession of said different images is generated in a random manner and at irregular intervals.

4. The method according to claim 2, wherein each of the plurality of different images is generated for a same duration.

5. The method according to claim 1, wherein the size of the at least one image is increased progressively.

6. The method according to claim 1, wherein the following are provided:
different speeds of increase of the at least one image;
different durations of appearance of the at least one image;
different levels of at least one of contrast, of resolution, of colour and of size for the at least one image; and
different successions of the at least one image.

7. The method according to claim 1, wherein the avian species to be scared away include raptors, passerines, and galliformes.

8. The method according to claim 7, wherein the at least one image comprise a spiral for scaring away galliformes.

9. The method according to claim 7, wherein at least one image comprises eyes for scaring away raptors.

10. The method according to claim 1, wherein the single disc is generated on a white base.

11. The method according to claim 1, wherein the at least one image comprises eyes for scaring away at least raptors.

12. The method according to claim 1, wherein the at least one image comprises a spiral for scaring away at least galliformes.

* * * * *